(12) United States Patent
Diemer et al.

(10) Patent No.: US 7,419,041 B2
(45) Date of Patent: Sep. 2, 2008

(54) MAIN SHAFT DOG CLUTCH AND METHOD

(75) Inventors: John A. Diemer, Farmington Hills, MI (US); Boris I. Burgman, Oak Park, MI (US); Henryk Sowul, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 157 days.

(21) Appl. No.: 11/153,172

(22) Filed: Jun. 15, 2005

(65) Prior Publication Data
US 2006/0040782 A1    Feb. 23, 2006

Related U.S. Application Data

(60) Provisional application No. 60/602,976, filed on Aug. 19, 2004.

(51) Int. Cl.
*F16D 11/14* (2006.01)
*F16D 25/061* (2006.01)

(52) U.S. Cl. ............... 192/69.7; 192/69.91; 192/91 A; 475/138; 475/140

(58) Field of Classification Search ............. 192/69.91, 192/69.7, 69.41, 89.27; 475/138, 140, 269
See application file for complete search history.

(56) References Cited

U.S. PATENT DOCUMENTS

| | | | | |
|---|---|---|---|---|
| 2,742,991 | A * | 4/1956 | Gilbert et al. ............. | 192/91 A |
| 4,293,061 | A * | 10/1981 | Brown ...................... | 192/85 A |
| 5,044,481 | A * | 9/1991 | Yoshida et al. ........... | 192/69.91 |
| 5,788,038 | A * | 8/1998 | Hickey et al. ............. | 475/138 |
| 6,131,686 | A * | 10/2000 | Scotti et al. ............... | 192/91 A |
| 6,364,045 | B1 * | 4/2002 | Matsufuji et al. ......... | 192/91 A |
| 6,830,142 | B2 * | 12/2004 | Weilant .................... | 192/69.91 |

* cited by examiner

*Primary Examiner*—Rodney H Bonck

(57) ABSTRACT

A transmission shaft is divided into a first shaft portion releasably connectable to a first electric motor/generator via a first gear set and a second shaft portion connected to a second electric motor/generator via a second gear set. The first and second shaft portions are operatively connected to one another for rotation together. The first shaft portion is selectively slidable with respect to the second shaft portion to connect and disconnect the first shaft portion and the first gear set.

10 Claims, 1 Drawing Sheet

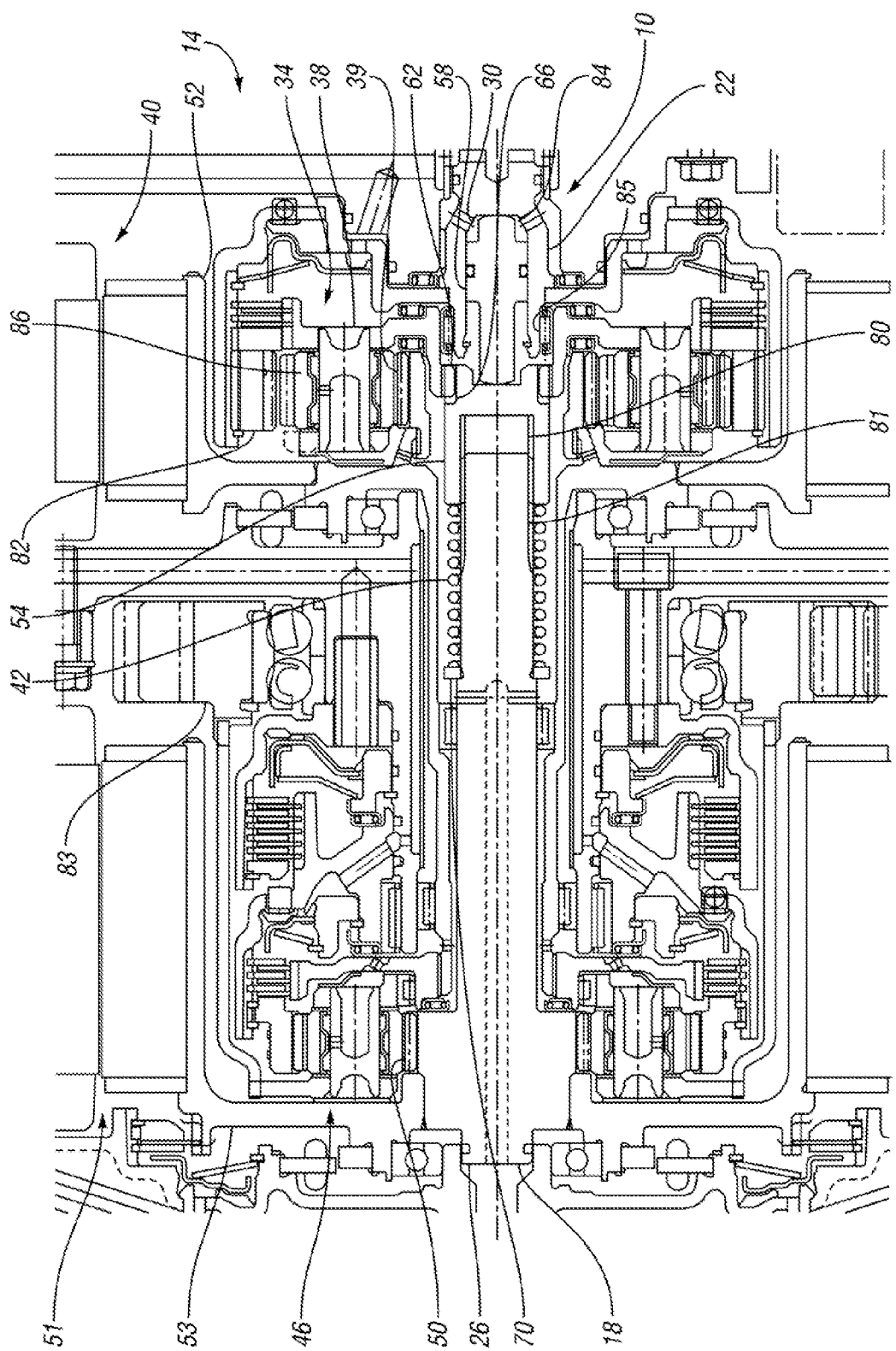

MAIN SHAFT DOG CLUTCH AND METHOD

CROSS-REFERENCE TO RELATED APPLICATION

This application claims the benefit of U.S. Provisional Application 60/602,976 filed Aug. 19, 2004, which is hereby incorporated by reference in its entirety.

TECHNICAL FIELD

A clutch operable as an engine disconnect clutch within a transmission system.

BACKGROUND OF THE INVENTION

The electrically-variable transmission (EVT) has been proposed for vehicles to improve fuel economy and reduce emissions. The EVT splits power between an input shaft and an output shaft into a mechanical power path and an electrical power path by means of differential gearing. The mechanical power path may include clutches and additional gears. The electrical power path may employ two electrical power units, each of which may operate as a motor or as a generator ("motor/generator"). With an electric storage battery, the EVT can be incorporated into a propulsion system for a hybrid electric vehicle.

The hybrid vehicle or hybrid propulsion system uses an electrical power source, such as a battery, as well as an engine power source. The battery is connected with the electrical drive units through an electronic control unit (ECU), which distributes the electrical power as required. The ECU also has connections with the engine and vehicle to determine operating characteristics, or operating demand, so that the electrical power units are operated properly as either a motor or a generator. When operating as a generator, an electrical power unit accepts power from either the vehicle or the engine and stores the power in the battery, or provides that power to operate another electrical device or another electrical power unit on the vehicle or on the transmission.

One of the benefits of having an electrically-variable transmission incorporating more than one mode of operation is that each mode of operation will generally incorporate at least one mechanical point at which no electrical energy is present in either motor/generator, thereby reducing losses.

A power transmission in an electromechanical transmission is described in commonly assigned United States Provisional Application entitled "Electrically Variable Transmission with Selective Fixed Ratio Operation," U.S. Ser. No. 60/590,427, Holmes et al., filed Jul. 22, 2004 and is hereby incorporated by reference in its entirety.

One current issue with gasoline/electric vehicles is their ability to effectively operate in reverse. Previous gasoline/electric vehicles generally operate in reverse in two ways. One method of operating in reverse is to use the electric motor to propel the vehicle in reverse. Since the engine attempts to propel the vehicle forward, the electric motor must overpower the running engine. Such counteraction between the engine and the electric motor causes large losses because only a portion of electric motor power is used to reverse the vehicle. A second method of operating in reverse uses the electric motor to drive the vehicle in reverse while the engine is not running. This method, however, does not permit the vehicle to generate energy while reversing. Thus, it only permits the vehicle to operate in reverse until the battery is depleted or discharged. Once the battery has exhausted all of its energy and is fully discharged the vehicle will not be capable of reversing any further.

SUMMARY OF THE INVENTION

The invention provides a dog clutch that is operable as an engine/motor disconnect clutch within a hybrid system such as a gasoline/electric transmission system. The clutch is housed on the main shaft of the transmission. The main shaft is divided into a first main shaft portion releasably connected to a first planetary carrier of a first gear set and a second main shaft portion connected to a sun gear of a second gear set and connectable to the first main shaft portion. First and second motors/generators are connected to the first and second gears sets, respectively. The clutch includes a hydraulically actuatable piston slidably located in the input shaft and a spring-biased first main shaft portion juxtaposed with the piston and located on the second main shaft portion. A first planetary carrier or member of the first gear set is releasably engaged with the first main shaft portion, which, through the second main shaft portion, is engaged with a sun gear or member of the second gear set. When the clutch is actuated, pressurized fluid acts on the piston which slides the first main shaft portion against the spring bias to disengage the first gear set from the first main shaft portion and the second main shaft portion and, thus, to disengage the first gear set from the second gear set. Accordingly, since the engine is connected with the first gear set and the second motor/generator is connected with the second gear set, the clutch may disconnect the engine from the second motor/generator, which is particularly advantageous when the vehicle is operating in reverse.

The present invention provides a means to propel a gasoline/electric vehicle in reverse in such a way that the engine and motor do not counteract and the vehicle is able to generate storable energy while operating in reverse.

More specifically, the present invention provides a clutch adapted for engagement in a transmission having a plurality of gear sets. The clutch comprises an input shaft having at least one fluid inlet for pressurized fluid, a rotatable first main shaft portion being engageable with a first gear set, and a rotatable second main shaft portion having a spring and being engageable with a second gear set. The first main shaft portion is slidably movable with respect to the second main shaft portion and rotatable therewith and is in a bias relationship with the spring for movement in a first direction. A piston is slidably movable for actuating movement of the first main shaft portion. The piston may be in fluid flow communication with sufficiently pressurized fluid at the fluid inlet for movement in a second direction opposite the first direction. The first gear set and the first main shaft portion are relatively engageable and disengageable. The spring biases the first main shaft portion to engage the first gear set when the piston is not in fluid flow communication with sufficiently pressurized fluid at the fluid inlet. Sufficiently pressurized fluid at the fluid inlet forces the piston to disengage the first main shaft portion from the first gear set. When the sufficiently pressurized fluid is depleted at the fluid inlet, the spring biases the first main shaft portion to re-engage the first gear set.

The present invention also provides a main shaft adapted for use in an electrically-variable transmission system having a first electrical power unit connected with a first gear set and a second electrical power unit connected with a second gear set. The main shaft comprises a first main shaft portion engageable with a member of the first gear set and a second main shaft portion axially aligned with the first main shaft portion and engaged with a member of the second gear set. The main shaft also comprises a piston axially aligned with the first main shaft portion and the second main shaft portion and axially movable with respect to one of the first and second main shaft portions. The member of the first gear set is engageable with the first main shaft portion, the second main shaft portion, and the member of the second gear set when the piston has axially moved in a first direction. The member of the first gear set is disengageable from the first main shaft portion, the second main shaft portion, and the member of the second gear set when the piston has axially moved in a second direction, opposite the first direction.

The present invention further provides a method of selectively engaging and disengaging a main shaft having a first main shaft portion engageable with a first gear set and a second main shaft portion engageable with a second gear set in a transmission. The method comprises slidably engaging the first main shaft portion with the second main shaft portion and biasing the first main shaft portion in a first direction with respect to the second main shaft portion to engage the first main shaft portion with the first gear set. The method further comprises providing sufficiently pressurized fluid to the first main shaft portion to slide the first main shaft portion in a second direction to disengage the first main shaft portion from the first gear set and rebiasing the first main shaft portion in the first direction when the sufficiently pressurized fluid is exhausted.

The above features and advantages and other features and advantages of the present invention are readily apparent from the following detailed description of the best modes for carrying out the invention when taken in connection with the accompanying drawings.

BRIEF DESCRIPTION OF THE DRAWING

FIG. 1 is a fragmentary cross-sectional view of an EVT transmission including a clutch in accordance with the present invention.

DESCRIPTION OF THE PREFERRED EMBODIMENTS

FIG. 1 shows a clutch 10 in accordance with the present invention for use in combination with and modification of an electrically-variable transmission (EVT) 14. The clutch 10, which is shown as a dog clutch, operates coaxially with the transmission main shaft 18, which may be connected to an engine input shaft portion 22 through a first or input gear set 34 of the hybrid transmission 14, which receives power from an engine. Input/engine torque is transferred to the transmission main shaft 18 through a damper (not shown), the engine input shaft 22, and then to the first ring gear 82 of the first gear set 34. The transmissions main shaft 18 contains a first main shaft portion 54 and a second main shaft portion 26. The clutch 10 effectively engages and disengages the first planetary carrier 38 of the first gear set 34 with respect to the transmission's first main shaft portion 54.

Referring to the first gear set 34, having a plurality of members 38, 39, 82, 86, the first planetary carrier 38 carries planet gears 86 which are meshingly engaged with a ring gear 82 and sun gear 39. The first sun gear 39 is connected to a first electrical power unit 40 of the transmission. An electrical power unit may operate as a motor to drive the transmission first sun gear 39 or as a generator to charge a battery. The second main shaft portion 26 is equipped with a spring 42 and is engaged with a second gear set 46 having a plurality of members, including a second member or sun gear 50 which is connected to a second electrical power unit 51. "Connected" implies that each sun gear 39, 50 is connected either indirectly through a rotor hub 52, 53 or similar structure, as illustrated in FIG. 1, or directly to the electrical power unit 40, 51. The rotor hub structures 52, 53 are respectively "wineglass" and "umbrella" shaped as shown and described in commonly-assigned "Transmission Packaging and Rotor Support Structure," to Klemen et al., U.S. Ser. No. 60/602,983 filed Aug. 19, 2004, which is incorporated herein in its entirety.

The first main shaft portion 54 is slidably located on the second main shaft portion 26 in biased relationship with the spring 42, which biases the first main shaft portion bias is in a first direction. "Slidably" implies that the first main shaft portion 54 is engaged with the second main shaft portion 26 but may move or shuttle axially back and forth along the second main shaft portion 26. The first main shaft portion 54 may have a plurality of first main shaft portion splines 80 engageable with a plurality of second main shaft portion splines 81, which allow relative axial movement between the first main shaft portion 54 and the second main shaft portion 26. The spring 42 may be fixed or stopped at one end to the second main shaft portion 26 by a washer 70, as illustrated in FIG. 1, or by a c-clamp, a spring locator, or any other positive stop or similar device. The second end of the spring 42 is in a biased relationship with the first main shaft portion 54. A piston 58 is slidably located in the input shaft portion 22, which has one or more fluid inlets 30. In a second embodiment of the present invention, which is not illustrated, the piston 58 and the first main shaft portion 54 may comprise a single or unitary structure. Additionally, an apply chamber 84 may be located between the fluid inlet 30 and the piston 58. The piston 58 is in fluid flow communication with the fluid inlet 30 such that pressurized fluid at the fluid inlet 30 will bias the piston 58 in a second direction, opposite the first direction of the spring 42 bias.

An internal first spline 62, connected to the first planetary carrier 38 of the gear set 34, is engaged with the external second spline 66 located on the first main shaft portion 54. When the first main shaft portion 54 is biased in the first direction by the spring 42, the second spline 66 is engaged with the first spline 62 and, thus, the first planetary carrier 38 is effectively engaged with the second sun gear 50 through the first main shaft portion 54 and the second main shaft portion 26. When the first planetary carrier 38 is effectively engaged with the second sun gear 50, the first electrical power unit 40 is effectively engaged with the second electrical power unit 51 through the first or "wineglass-shaped" rotor hub 52, the first gear set 34, the first main shaft portion 54, the second main shaft portion 26, and the second "umbrella-shaped" rotor hub 53. The splines 62, 66 may be any pair of interconnectable members that provide for engagement and disengagement between the first gear set 34 and the first main shaft portion 54.

When sufficiently pressurized fluid is at the fluid inlet 30, the piston 58 will be biased in the second direction, opposite the spring bias. Sufficiently pressurized fluid is fluid having a pressure which is large enough to overcome the spring bias so that the piston 58 will slide or shuttle the first main shaft portion 54 in the second direction, compressing the spring 42. Once the first main shaft portion 54 has slid or shuttled in the second direction, the first or internal spline 62 and the second or external spline 66 disengage. When the splines 62, 66 are disengaged, the first electrical power unit 40 and first gear set 34 are disengaged from the first main shaft portion 54 and, thus, from the second main shaft portion 26, the second gear set 46, and the second electrical power unit 51. When the first electrical power unit 40 is disengaged from the second electrical power unit 51, the first electrical power unit 40 may charge the battery while the second electrical power unit 51 may be controlled by an electronic control unit to operate as a power unit for the transmission's second main shaft portion 26. Disengaged dog clutch 10 disconnects the engine (not shown) and first electrical power unit 40 from the second electrical power unit 51 and output member 83.

When the sufficiently pressurized fluid at the fluid inlet 30 is exhausted, the spring 42 will force or rebias the first main shaft portion 54 and the piston 58 back in the first direction, wherein the first spline 62 and the second spline 66 will re-engage, as shown in FIG. 1. The re-engagement of the first spline 62 and second spline 66 will re-engage the first electrical power unit 40 and first gear set 34 with the second electrical power unit 51 and second gear set 46 so that both electrical power units 40, 51 may be controlled by an electronic control unit to operate as power units for the transmission main shaft 18.

While the best modes for carrying out the invention have been described in detail, those familiar with the art to which this invention relates will recognize various alternative designs and embodiments for practicing the invention within the scope of the appended claims.

The invention claimed is:

1. A clutch adapted for engagement in a transmission having a plurality of gear sets and comprising:
    an input shaft having at least one fluid inlet for pressurized fluid;
    a rotatable first main shaft portion being engagable with a first gear set;
    a rotatable second main shaft portion having a spring, said second main shaft portion being engagable with a second gear set;
    wherein said first main shaft portion is slidably movable with respect to said second main shaft portion and rotatable therewith;
    wherein said first main shaft portion is in a bias relationship with said spring for movement in a first direction;
    a piston slidably movable for actuating movement of said first main shaft portion, said piston being selectively in fluid flow communication with sufficiently pressurized fluid at said fluid inlet for movement in a second direction opposite said first direction;
    wherein said first gear set and said first main shaft portion are engagable and disengagable;
    wherein said spring biases said first main shaft portion to engage the first gear set when the piston is not in fluid flow communication with sufficiently pressurized fluid at said fluid inlet;
    wherein sufficiently pressurized fluid at said fluid inlet forces said piston to disengage the first main shaft portion from said first gear set; and
    wherein when sufficiently pressurized fluid is depleted at said fluid inlet, said spring biases said first main shaft portion to re-engage said first gear set.

2. The clutch of claim 1 wherein the clutch is a dog clutch.

3. The clutch of claim 1 wherein the input shaft has at least two fluid inlets.

4. The clutch of claim 1 wherein the input shaft, rotatable first main shaft portion, rotatable second main shaft portion, and said piston are coaxial.

5. The clutch of claim 1 wherein the engagement between the first main shaft portion and the first gear set comprises at least one pair of interconnecting splines.

6. The clutch of claim 1 wherein an apply chamber is defined between said fluid inlet of said input shaft and said piston such that said piston is in fluid flow communication with said fluid inlet to pressurize the fluid in said apply chamber and bias said piston in said second direction, opposite the spring bias.

7. The clutch of claim 1 wherein said first gear set surrounds said first main shaft portion and said second gear set surrounds said second main shaft portion.

8. The clutch of claim 1, further comprising a first power unit connected to said first gear set and a second power unit connected to said second gear set.

9. The clutch of claim 8, wherein said first power unit is engaged with said second power unit when said first main shaft portion is engaged with said first gear set.

10. The clutch of claim 8, wherein said first power unit is disengaged from said second power unit when said first main shaft portion is disengaged from said first gear set such that said first power unit charges a battery and said second power unit operates as a power unit for generating power.

\* \* \* \* \*